(12) United States Patent
Kim et al.

(10) Patent No.: US 12,522,554 B2
(45) Date of Patent: Jan. 13, 2026

(54) METHOD FOR PREPARING INTERMEDIATE FOR SYNTHESIS OF SPHINGOSINE-1-PHOSPHATE RECEPTOR AGONIST

(71) Applicant: LG CHEM, LTD., Seoul (KR)

(72) Inventors: Sung Wook Kim, Seoul (KR); Ki Dae Kim, Seoul (KR); Soo Min Lee, Seoul (KR); Ho Yeon Lee, Seoul (KR); Jin Ok Ham, Seoul (KR)

(73) Assignee: LG CHEM, LTD., Seoul (KR)

( * ) Notice: Subject to any disclaimer, the term of this patent is extended or adjusted under 35 U.S.C. 154(b) by 349 days.

(21) Appl. No.: 18/248,721

(22) PCT Filed: Oct. 12, 2021

(86) PCT No.: PCT/KR2021/014009
§ 371 (c)(1),
(2) Date: Apr. 12, 2023

(87) PCT Pub. No.: WO2022/080813
PCT Pub. Date: Apr. 21, 2022

(65) Prior Publication Data
US 2024/0002322 A1 Jan. 4, 2024

(30) Foreign Application Priority Data

Oct. 13, 2020 (KR) .................. 10-2020-0131824

(51) Int. Cl.
*C07C 45/67* (2006.01)
*C07C 67/29* (2006.01)

(52) U.S. Cl.
CPC ............ *C07C 45/676* (2013.01); *C07C 67/29* (2013.01); *C07B 2200/13* (2013.01)

(58) Field of Classification Search
CPC .................. C07C 45/676; C07C 45/67
See application file for complete search history.

(56) References Cited

U.S. PATENT DOCUMENTS

| 8,039,674 B2 * | 10/2011 | Habashita ............. C07C 217/60 564/316 |
| 9,540,362 B2 * | 1/2017 | Paek ...................... A61P 37/06 |
| 11,899,025 B2 | 2/2024 | Bae et al. |
| 2012/0064060 A1 | 3/2012 | Habashita et al. |
| 2015/0376173 A1 | 12/2015 | Paek et al. |

FOREIGN PATENT DOCUMENTS

| EP | 1760071 A1 | 3/2007 |
| EP | 4306513 A1 | 1/2024 |
| JP | 5397461 B2 | 1/2014 |
| JP | 2021-035934 A | 3/2021 |
| KR | 10-2014-0104376 A | 8/2014 |
| KR | 10-2016-0033554 A | 3/2016 |
| KR | 10-1939657 B1 | 1/2019 |
| KR | 10-2019-0110938 A | 10/2019 |
| WO | 2004-009582 A1 | 1/2004 |
| WO | 2014129796 A1 | 8/2014 |

OTHER PUBLICATIONS

Written Decision on Registration issued for Korean Patent Application No. 10-2021-0134775 issued on Feb. 21, 2024, 6 pages.
Extended European Search Report issued for European Patent Application No. 21880460.7 issued on Mar. 15, 2024, 6 pages.
International Search Report issued for International Application No. PCT/KR2021/014009 on Jan. 24, 2022, 5 pages.
Aaseng, J.E. et al. "Asymmetric catalytic aziridination of dihydronaphthalenes for the preparation of substituted 2-aminotetralins" Tetrahedron, 2010, vol. 66, pp. 9790-9797.
Rath, S.K. et al. "Synthesis of amides from (E)-3-(1-chloro-3,4-dihydronaphthalen-2-yl) acrylic acid and substituted amino acid esters as NorA efflux pump inhibitors of *Staphylococcus aureus*," Bioorganic & Medicinal Chemistry, 2019, vol. 27, pp. 343-353.

* cited by examiner

*Primary Examiner* — Sikarl A Witherspoon
(74) *Attorney, Agent, or Firm* — ROTHWELL, FIGG, ERNST & MANBECK, P.C.

(57) ABSTRACT

The present invention relates to a novel method for producing an intermediate expressed by chemical formula 5 that can be effectively used in synthesis of sphingosine-1-phosphate receptor agonist.

11 Claims, No Drawings

METHOD FOR PREPARING INTERMEDIATE FOR SYNTHESIS OF SPHINGOSINE-1-PHOSPHATE RECEPTOR AGONIST

CROSS REFERENCE TO RELATED APPLICATION(S)

This application is a 35 U.S.C. 371 National Phase Entry Application from PCT/KR2021/014009 filed on Oct. 12, 2021, which claims priority to and the benefit of Korean Patent Application No. 10-2020-0131824 filed in the Korean Intellectual Property Office on Oct. 13, 2020, the entire contents of which are incorporated herein by reference.

TECHNICAL FIELD

The present invention relates to a method of preparing a major intermediate for synthesizing sphigosine-1-phosphate receptor agonists. More specifically, the present invention relates to a novel preparation method capable of large-scale production of an intermediate compound of the following Formula 5 in a high yield with a simple process under mild conditions:

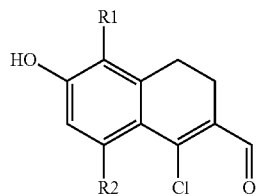

[Formula 5]

wherein,
R1 and R2 are each independently hydrogen, alkyl, halogen, haloalkyl or alkoxyalkyl.

BACKGROUND ART

Sphingosine-1-phosphate (S1P) is produced via an intracellular ceramide pathway, in which ceramide is the starting material. Ceramide is produced via two pathways, the first of which is a de novo biosynthetic pathway. Ceramide is also produced by the degradation of sphingomyelin, a cell membrane constituent, in a cell. The S1P level in each tissue is controlled by two biosynthetic sphingosine kinases (SphKs) and two biodegradable S1P phosphatases (S1P lyase and lysophospholipid phosphatases). S1P—which is produced via phosphorylation of sphingosine by sphingosine kinase—is known to mediate various cellular responses, such as cell proliferation, cytoskeletal organization and migration, adherence- and tight junction assembly, and morphogenesis. S1P exists as a combined form with plasma protein including albumin at high level (100-1,000 nM) in plasma, while it is at a low level in tissues.

S1P binds with S1P receptor, a G-protein coupled receptor, to show various biological functions. As S1P receptor sub-types, S1P1 to S1P5 are known up to now and are named endothelial differentiation gene (EDG) receptors 1, 5, 3, 6 and 8, respectively. The S1P receptors are known to be involved in various biological functions such as leukocyte recirculation, neural cell proliferation, morphological changes, migration, endothelial function, vasoregulation and cardiovascular development.

In recent years, many studies have found that the S1P signaling process via these receptors plays an important role in a series of responses related to multiple sclerosis including inflammation response and the repair process, and a non-selective S1P1 agonist was actually approved as a therapeutic agent for multiple sclerosis. S1P receptors are extensively expressed in many cells related to the induction of multiple sclerosis. Especially, S1P1 receptor plays a major role in the immune system. S1P1 receptor is mainly expressed on the surface of lymphocytes such as T cell and B cell, and responds to S1P resulting in involvement in recirculation of lymphocytes. In normal condition, the S1P concentration is higher in body fluid than in lymphoid tissue, and therefore lymphocytes leave lymphoid tissue by the difference of S1P concentration to circulate after efferent lymph circulates. However, if S1P1 receptor in lymphocytes is down-regulated by S1P1 agonist, the egress of lymphocytes from lymphoid tissue does not occur, resulting in reduced infiltration of autoaggressive lymphocytes which cause inflammation and tissue damage in the central nervous system (CNS). As a result, a therapeutic effect on multiple sclerosis is obtained. Fingolimod—which is a non-selective S1P1 agonist—has been approved as an oral medication for the treatment of multiple sclerosis. When it binds at S1P1 receptor to be activated, the receptor becomes degraded or internalized from the surface of lymphocytes ironically, and thus it acts as a functional S1P1 antagonism.

With respect to such S1P receptor, Korean Patent Application Publication No. 10-2014-0104376 discloses novel compounds of the following Formula 1 which are effective as an S1P receptor agonist:

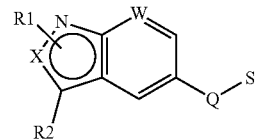

[Formula 1]

wherein,
X represents C or N,
R1 represents H or optionally substituted alkyl,
R2 represents H, optionally substituted alkyl, halogen, CN, $CF_3$ or $COCF_3$,
W represents C, N, C-alkoxy, C-halogen or C—CN,
Q represents $CH_2O$ or

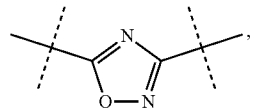

S is selected from the following residues:

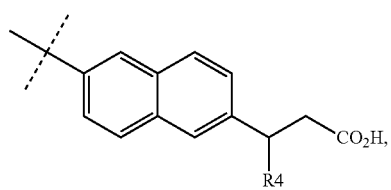

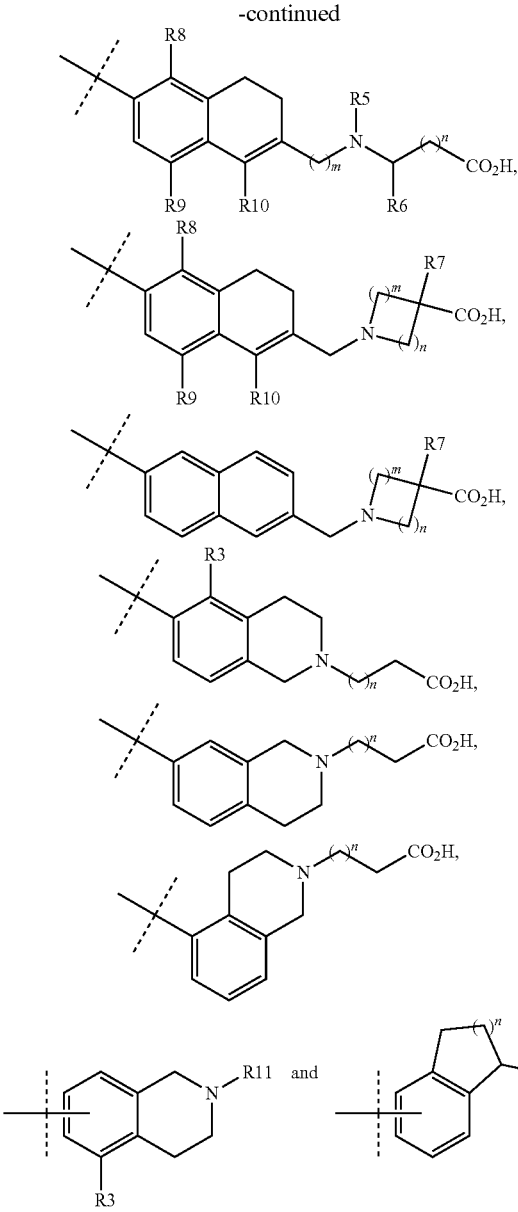

wherein m and n represent independently 0, 1, 2 or 3,

R3~R10 represent independently H, alkyl, halogen, halogenoalkyl or alkoxyalkyl,

R11 represents H, H, or and

R12 represents OH NH$_2$,

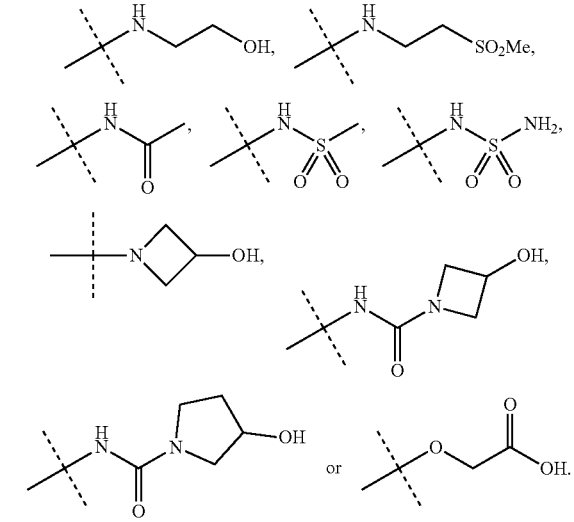

In a specific example of the above document, the preparation of 1-[1-chloro-6-(3-chloro-1-isopropyl-1H-indazol-5-ylmethoxy)-3,4-dihydro-naphthalen-2-ylmethyl]-piperidine-4-carboxylic acid according to the following Reaction Scheme 1 is disclosed ("SG35" in Reaction Scheme 1 refers to "1-chloro-6-hydroxy-3,4-dihydro-naphthalene-2-carbaldehyde").

[Reaction Scheme 1]

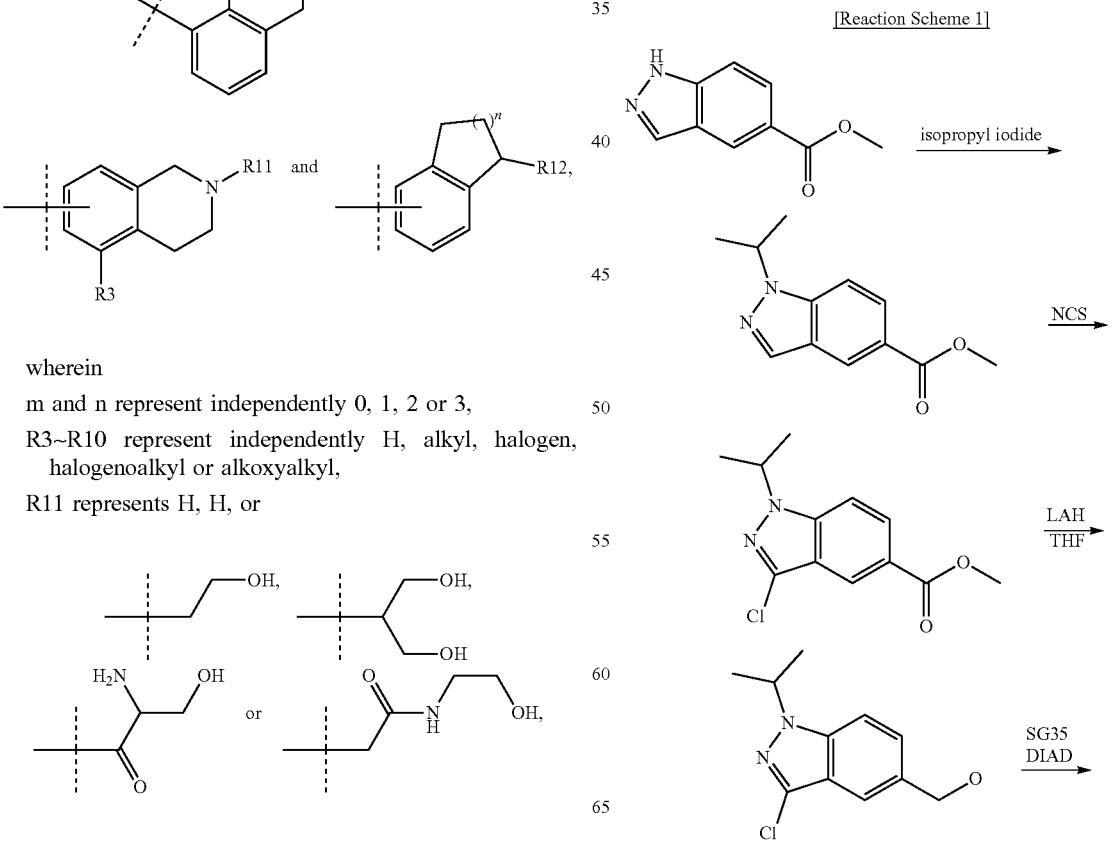

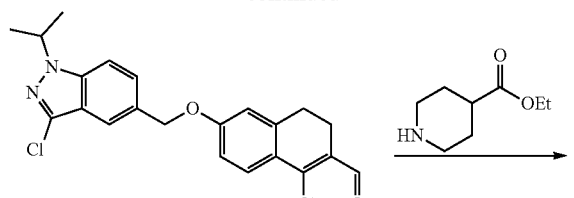
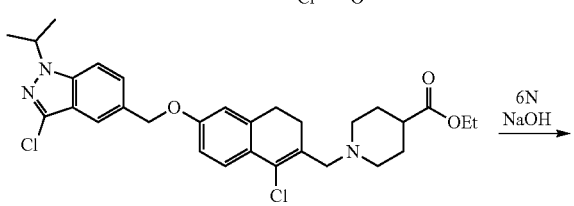
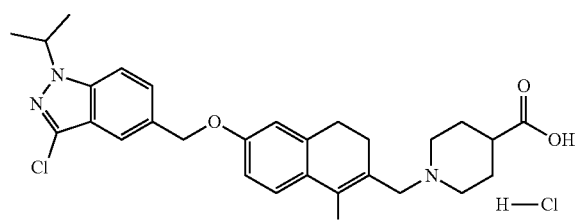
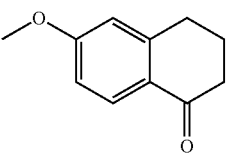
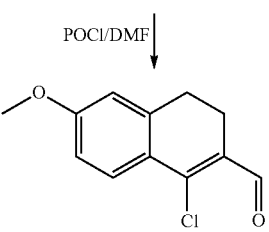
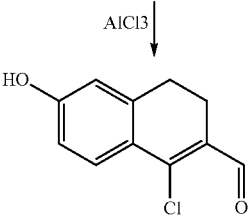

SG35

In the above Reaction Scheme 1, the steps of preparing 1-chloro-6-hydroxy-3,4-dihydro-naphthalene-2-carbaldehyde can be described in detail as the following Reaction Scheme 2.

[Reaction Scheme 2]

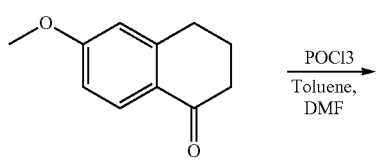

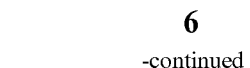
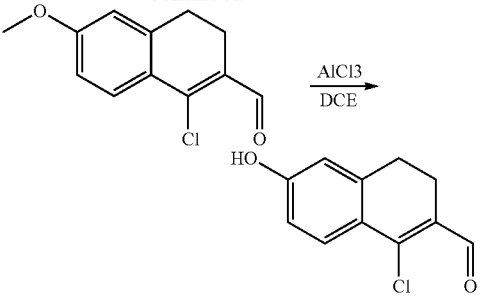

First, to a solution in which 6-methoxy-3,4-dihydronaphthalen-1(2H)-one was dissolved in toluene, N,N-dimethylformamide (DMF) and phosphorous oxychloride ($POCl_3$) were added dropwise at 0° C., followed by stirring at 70° C. for 6 hours. The reaction mixture was poured into ice and extracted with ethyl acetate. The organic layer was washed with brine, dried and concentrated, and the resulting residue was purified by silica gel column chromatography (hexane:ethyl acetate=20:1 to 10:1) to obtain 1-chloro-6-methoxy-3,4-dihydro-2-naphthalenecarbaldehyde.

Next, aluminum chloride ($AlCl_3$) was added to a solution of 1-chloro-6-methoxy-3,4-dihydro-2-naphthalenecarbaldehyde in dichloromethane at 0° C. and then stirred at 50° C. for 6 hours. The reaction mixture was poured into ice and extracted with ethyl acetate. The organic layer was dried and concentrated, and the resulting residue was purified by silica gel column chromatography (hexane:tetrahydrofuran=5:1 to 3:1) to obtain 1-chloro-6-hydroxy-3,4-dihydro-2-naphthalenecarbaldehyde.

However, at the time of Vilsmeier-Haack reaction to obtain 1-chloro-6-methoxy-3,4-dihydro-2-naphthalenecarbaldehyde, there may be an exothermic problem since it reacts at a high temperature of 70° C., and there is a need to improve the yield since the total yield is 80%. In addition, in the reaction to obtain 1-chloro-6-hydroxy-3,4-dihydro-2-naphthalenecarbaldehyde, there may be a reactor contamination problem due to the use of $AlCl_3$ or a safety problem due to the use of hazardous reagents. At the time of using $AlCl_3$, there may be a stability problem due to the occurrence of batch fail according to reaction stop or side reaction progress, and there is a need to improve the yield since the total yield is 70%.

DISCLOSURE OF INVENTION

Technical Problem

Accordingly, the technical problem of the present invention is the provision of a method suitable for large-scale production of a compound of Formula 5—which is a key intermediate in the synthesis of an excellent sphingosine-1-phosphate receptor agonist—in a high yield through a simpler process.

Solution to Problem

To solve the above technical problem, the present invention provides a method for preparing an intermediate compound of the following Formula 5 comprising the following steps of:
i) a step of preparing a compound of Formula 3 by reacting a compound of Formula 2 with an acetylating agent and a base in an organic solvent, ii) a step of preparing a compound of Formula 4 by Vilsmeier-Haack reaction of the compound of Formula 3, and iii) a step of preparing a compound of Formula 5 by removing an acetyl group from the compound of Formula 4:

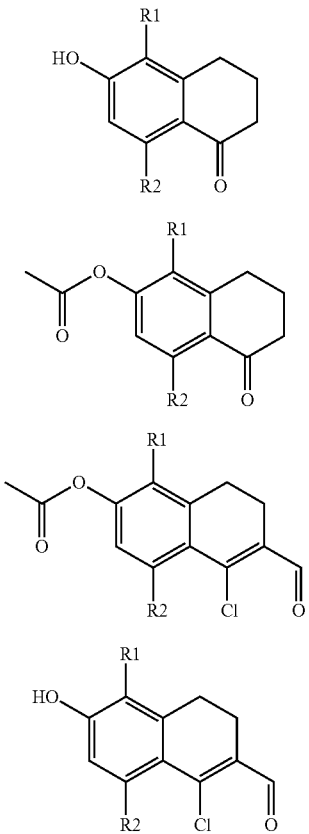

[Formula 2]

[Formula 3]

[Formula 4]

[Formula 5]

wherein,

R1 and R2 are each independently hydrogen, alkyl, halogen, haloalkyl or alkoxyalkyl.

The present invention is described in detail hereinafter.

According to one embodiment of the present invention, in the above Formulas, R1 and R2 are each independently hydrogen, $C_1$-$C_6$ alkyl, halogen, halo-$C_1$-$C_6$ alkyl or $C_1$-$C_6$ alkoxy-$C_1$-$C_6$ alkyl.

According to another embodiment of the present invention, in the above Formulas, R1 and R2 are each independently hydrogen or $C_1$-$C_4$ alkyl.

In the preparation method of the present invention, in step (i), the compound of Formula 3 is prepared by reacting the compound of Formula 2 with an acetylating agent and a base in an organic solvent.

In another embodiment according to the present invention, the organic solvent of step (i) may be one or more selected from—for example—dichloromethane (DCM), dichloroethane (DCE), toluene, acetonitrile (ACN) and a mixture thereof.

In another embodiment according to the present invention, the acetylating agent of step (i) may be acetyl chloride or acetic anhydride.

In another embodiment according to the present invention, the base of step (i) may be one or more selected from triethylamine (TEA), N,N-diisopropylethylamine (DIPEA), 1,8-diazabicyclo(5.4.0)undec-7-ene (DBU), sodium hydroxide (NaOH), potassium carbonate ($K_2CO_3$), sodium carbonate ($Na_2CO_3$) and a mixture thereof.

In the preparation method of the present invention, in step (ii), the compound of Formula 4 is prepared by Vilsmeier-Haack reaction of the compound of Formula 3.

In another embodiment according to the present invention, the Vilsmeier-Haack reaction in step (ii) may be carried out at a temperature of 30° C. or below, more preferably at a temperature 20 to 25° C.

In the preparation method of the present invention, in step (iii), the compound of Formula 5 is prepared by deprotecting in which an acetyl group is removed from the compound of Formula 4.

In another embodiment according to the present invention, the removal of the acetyl group may be carried out with—for example, $K_2CO_3$.

In another embodiment according to the present invention, the deprotecting reaction for removing the acetyl group may be carried out at room temperature.

In another embodiment according to the present invention, the compound of Formula 5 prepared in step (iii) may be directly crystallized—for example—by dropwise addition of hydrochloric acid (HCl) without processes such as drying or filtration.

Effects of the Invention

The preparation method of the present invention does not use dangerous reagents that can contaminate a reactor such as $AlCl_3$, and there is no problem of batch fail due to reaction stop or progress of side reactions. As a result, the preparation method of the present invention can provide large-scale production of the intermediate of Formula 5 in a high yield under mild conditions by carrying out Vilsmeier-Haack reaction and deprotecting reaction at room temperature while securing safety and stability.

MODE FOR THE INVENTION

Hereinafter, the present invention is explained in more detail with the following examples. However, it must be understood that the protection scope of the present invention is not limited to the examples.

Example 1-1: Synthesis of acetic acid 5-oxo-5,6,7,8-tetrahydro-naphthalen-2-yl ester 6-Hydroxy-3,4-dihydro-2H-naphthalen-1-one (3.9 kg, 24.07 mol) and dichloromethane (DCM, 25.88 kg) were added to a reactor, and the internal temperature was cooled to 0° C. Acetyl chloride (AcCl, 2.08 kg, 26.47 mol) was slowly added dropwise at 10° C. or below, and when the addition was completed, triethylamine (TEA, 2.92 kg, 28.88 mol) was added dropwise at 10° C. or below to proceed with the reaction. The internal temperature was raised to room temperature, and the reaction was carried out for 1 hour. Ion-pair chromatography (IPC) was carried out by HPLC, and the reaction was completed (6-hydroxy-3,4-dihydro-2H-naphthalen-1-one <1%). The reaction was terminated by adding 19.5 kg of purified water to the reaction product. Layer separation was carried out to remove water from the upper layer, and the organic layer was additionally washed with 19.5 kg of purified water and distilled under reduced pressure to obtain the title compound (4.66 kg, net yield: 95%).

$^1$H NMR (400 MHz, CDCl$_3$): 2.10 (m, 2H), 2.30 (s, 3H), 2.60 (t, 2H), 2.95 (t, 2H), 7.00 (s, 1H), 7.05 (d, 1H), 8.05 (d, 1H)

Example 1-2: Synthesis of 1-chloro-6-hydroxy-3,4-dihydro-naphthalene-2-carbaldehyde Phosphoryl chloride (POCl$_3$, 10.5 kg, 68.45 mol) was added to a reactor, and the internal temperature was cooled to 0° C. Dimethylformamide (DMF, 8.34 kg, 114.09 mol) was slowly added dropwise at 10° C. or below, followed by stirring for 30 minutes. 4.66 Kg of 5-oxo-5,6,7,8-tetrahydro-naphthalen-2-yl ester was slowly added dropwise to the reactor at 30° C. or below, and when the addition was completed, the reaction was carried out for 3 hours. IPC was carried out by HPLC, and the reaction was completed (acetic acid 5-oxo-5,6,7,8-tetrahydro-naphthalen-2-yl ester <2%). 46.60 Kg of purified water and 29.42 kg of ethyl acetate (EtOAc) were added to another reactor, and the internal temperature was cooled to 0° C. The above solution was slowly added dropwise to carry out quenching by decomposing the remaining POCl$_3$. After layer separation, the organic layer was collected in another reactor, and the aqueous layer was further extracted with 12.61 kg of EtOAc. The aqueous layer was removed, and the organic layer in another reactor was added. The collected organic layers were washed with 23.30 kg of purified water and then distilled under reduced pressure to remove the solvent. Methanol (MeOH, 22.95 kg) and K$_2$CO$_3$ (2.68 kg, 19.39 mol) were added to the residue, and the reaction was carried out at room temperature for about 2 hours. IPC was carried out by HPLC, and when the reaction was completed (5-chloro-6-formyl-7,8-dihydronaphthalen-2-yl acetate <1%), 19.39 kg of 3 N HCl was added dropwise to proceed with crystallization. When crystals were formed, the crystals were kept for 30 minutes, filtered, washed with 24.31 kg of purified water and dried with nitrogen to obtain the title compound (4.31 kg, net yield: 90.5%).

$^1$H NMR (500 MHz, CDCl$_3$): 2.30 (s, 3H), 2.65 (t, 2H), 2.85 (t, 2H), 7.00 (s, 1H), 7.05 (m, 1H), 7.90 (d, 1H), 10.40 (s, 1H)

The invention claimed is:

1. A method for preparing an intermediate compound of the following Formula 5 comprising the following steps of:
   i) a step of preparing a compound of Formula 3 by reacting a compound of Formula 2 with an acetylating agent and a base in an organic solvent,
   ii) a step of preparing a compound of Formula 4 by Vilsmeier-Haack reaction of the compound of Formula 3, and
   iii) a step of preparing the intermediate compound of Formula 5 by removing an acetyl group from the compound of Formula 4:

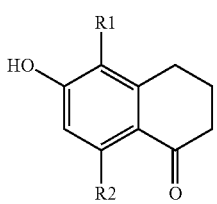

[Formula 2]

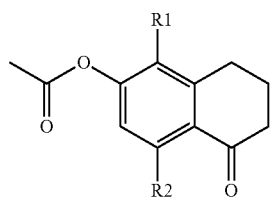

[Formula 3]

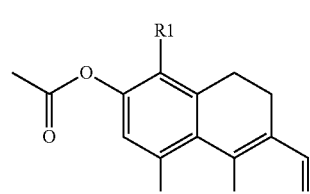

[Formula 4]

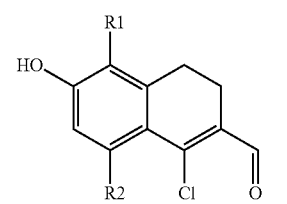

[Formula 5]

wherein,

R1 and R2 are each independently hydrogen, alkyl, halogen, haloalkyl or alkoxyalkyl.

2. The method according to claim 1, wherein R1 and R2 are each independently hydrogen, $C_1$-$C_6$ alkyl, halogen, halo-$C_1$-$C_6$ alkyl or $C_1$-$C_6$ alkoxy-$C_1$-$C_6$ alkyl.

3. The method according to claim 2, wherein R1 and R2 are each independently hydrogen or $C_1$-$C_4$ alkyl.

4. The method according to claim 1, wherein the organic solvent of step (i) is selected from dichloromethane, dichloroethane, toluene, acetonitrile, or a mixture thereof.

5. The method according to claim 1, wherein the acetylating agent of step (i) is acetyl chloride or acetic anhydride.

6. The method according to claim 1, wherein the base of step (i) is selected from N,N-diisopropylethylamine, 1,8-diazabicyclo(5.4.0)undec-7-ene, sodium hydroxide, potassium carbonate, sodium carbonate, or a mixture thereof.

7. The method according to claim 1, wherein the Vilsmeier-Haack reaction of step (ii) is carried out at a temperature of 30° C. or below.

8. The method according to claim 7, wherein the Vilsmeier-Haack reaction is carried out at a temperature of 20 to 25° C.

9. The method according to claim 1, wherein the removal of acetyl group in step (iii) is carried out with K$_2$CO$_3$.

10. The method according to claim 1, wherein the reaction of step (iii) is carried out at room temperature.

11. The method according to claim 1, wherein the intermediate compound of Formula 5 prepared in step (iii) is directly crystallized.

* * * * *